(12) United States Patent
Wijnands et al.

(10) Patent No.: US 8,422,364 B2
(45) Date of Patent: Apr. 16, 2013

(54) MULTICAST LABEL DISTRIBUTION PROTOCOL NODE PROTECTION

(75) Inventors: Ijsbrand Wijnands, Leuven (BE); Clarence Filsfils, Brussels (BE)

(73) Assignee: Cisco Technology, Inc., San Jose, CA (US)

( * ) Notice: Subject to any disclaimer, the term of this patent is extended or adjusted under 35 U.S.C. 154(b) by 300 days.

(21) Appl. No.: 12/800,527

(22) Filed: May 17, 2010

(65) Prior Publication Data

US 2011/0280123 A1    Nov. 17, 2011

(51) Int. Cl.
*H04J 3/14* (2006.01)

(52) U.S. Cl.
USPC ............ 370/228; 370/328; 370/390; 709/225

(58) Field of Classification Search ................ 370/228, 370/216, 390; 709/225
See application file for complete search history.

(56) References Cited

U.S. PATENT DOCUMENTS

| 2004/0114595 | A1* | 6/2004 | Doukai ..................... 370/389 |
| 2007/0019646 | A1* | 1/2007 | Bryant et al. ............... 370/390 |
| 2007/0104194 | A1  | 5/2007 | Wijnands et al. |
| 2007/0174483 | A1* | 7/2007 | Raj et al. ................... 709/238 |
| 2007/0201355 | A1* | 8/2007 | Vasseur et al. ............. 370/217 |
| 2007/0217428 | A1  | 9/2007 | Wijnands et al. |
| 2009/0268731 | A1  | 10/2009 | Narayanan et al. |

OTHER PUBLICATIONS

RFC 3209, D. Awduche et al., "RSVP-TE: Extensions to RSVP for LSP Tunnels", The Internet Society, Dec. 2001.
Int Draft"Label Distribution Protocol Extensions for Point-to-Multipoint and Multipoint-to-Multipoint Label Switched Paths",draft-ietf-mpls-ldp-p2mp-08, Minea et al., Oct. 2009.
Internet Draft, "LDP Extensions for MPLS Multicasting Services", draft-chung-mpls-ldp-multicasting-00.txt, Jong-Moon Chung et al., Feb. 2002.
Int Draft,"mLDP in-band signaling for Point-to-Multipoint and Multipoint-to-Multipoin Label Switched Paths",draft-wijnands-mpls-mldp-in-band-signaling-02,Wijnands etal, Oct. 2009.
Internet Draft, Multicast Extensions for LDP, draft-wijanands-mpls-ldp-mcast-ext-00.txt, I. Wijnands et al., Mar. 2005.

* cited by examiner

*Primary Examiner* — Pao Sinkantarakorn
*Assistant Examiner* — Richard K Chang
(74) *Attorney, Agent, or Firm* — Cindy Kaplan

(57) ABSTRACT

In one embodiment, a method includes receiving at a router, a multicast label distribution protocol message comprising local node information for a protected node and one or more leaf nodes downstream of the protected node in a primary label switched path, creating one or more backup label switched paths to the one or more leaf nodes, detecting a failure at the protected node, and forwarding at the router, traffic for the one or more leaf nodes to the one or more backup label switched paths. An apparatus for multicast label distribution protocol node protection is also disclosed.

17 Claims, 4 Drawing Sheets

US 8,422,364 B2

MULTICAST LABEL DISTRIBUTION PROTOCOL NODE PROTECTION

BACKGROUND

The present disclosure relates generally to communication networks, and more particularly, to multicast Label Distribution Protocol (mLDP) node protection.

Traditional Internet Protocol (IP) communication allows a host to send packets to a single host (unicast transmission) or to all hosts (broadcast transmission). To support a demand to provide applications such as audio and video conference calls, audio broadcasting, and video broadcasting that involve high data rate transmission to multiple hosts, a third routing technique has evolved, multicast routing. In multicast routing, a host sends packets to a subset of all hosts as a group transmission. Multicast routing protocols have been developed to conserve bandwidth by minimizing duplication of packets.

Label Distribution Protocol (LDP) is a set of procedures by which Label Switching Routers (LSRs) distribute labels to support Multi-Protocol Label Switching (MPLS) forwarding of unicast traffic along routing paths set by an IP unicast routing protocol. Label Switched Paths (LSPs) are established to carry traffic that is identified by its Forwarding Equivalence Class (FEC). Extensions to LDP for the setup of point-to-multipoint (P2MP) and multipoint-to-multipoint (MP2MP) LSPs in MPLS networks are referred to as mLDP.

BRIEF DESCRIPTION OF THE DRAWINGS

Corresponding reference characters indicate corresponding parts throughout the several views of the drawings.

DESCRIPTION OF EXAMPLE EMBODIMENTS

Overview

Figure 1:
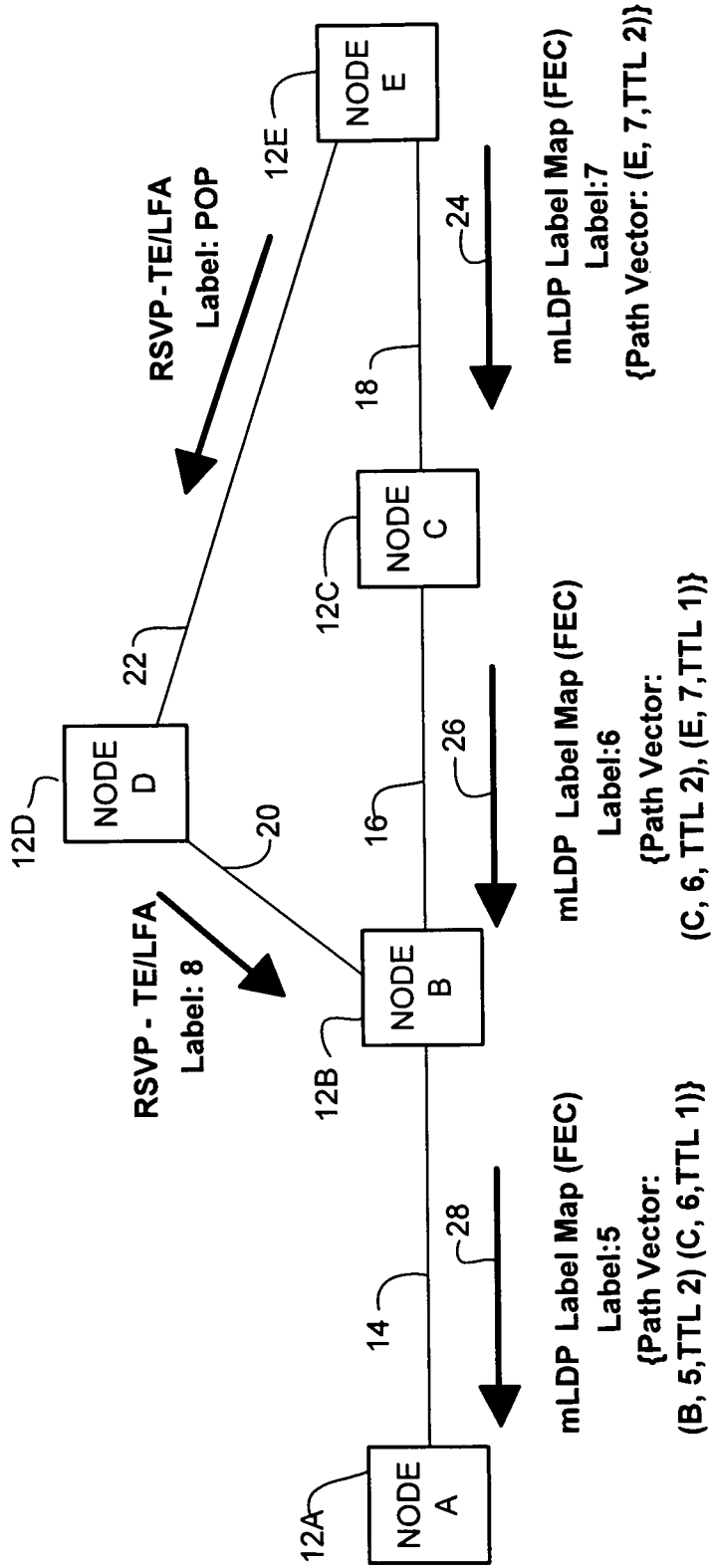
FIG. 1 illustrates an example of a network in which embodiments described herein may be implemented.

A method and apparatus for multicast label distribution protocol node protection are disclosed.

In one embodiment, a method generally comprises receiving at a router, a multicast label distribution protocol message comprising local node information for a protected node and one or more leaf nodes downstream of the protected node in a primary label switched path, creating one or more backup label switched paths to the one or more leaf nodes, detecting a failure at the protected node, and forwarding at the router, traffic for the one or more leaf nodes to the one or more backup label switched paths.

In another embodiment, an apparatus generally comprises means for processing a multicast label distribution protocol message received at the apparatus, the message comprising local node information for a protected node and one or more leaf nodes downstream of the protected node in a primary label switched path. The apparatus further comprises means for creating one or more backup label switched paths to the leaf nodes. The backup label switched paths each comprises a loop free alternate label switched path from the apparatus to a next-next-hop.

Example Embodiments

The following description is presented to enable one of ordinary skill in the art to make and use the embodiments. Descriptions of specific embodiments and applications are provided only as examples and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, features relating to technical material that is known in the technical fields related to the embodiments have not been described in detail.

The embodiments described herein allow a node running multicast Label Distribution protocol (mLDP) to be protected using a backup path to a node downstream of the protected node. The backup path may be created using a RSVP-TE (Resource ReSerVation Protocol—Traffic Engineering) P2P (Point-to-Point) LSP (Label Switched Path), or an LFA (Loop Free Alternate) P2P LSP, for example. As described below, node protection is enabled using mLDP messages that include local node information for a protected node and leaf nodes downstream of the protected node. It is to be understood that the term 'leaf node' as used herein refers to any node in a tree, including nodes at the end of the tree and nodes which have downstream nodes.

The embodiments described herein operate in the context of a data communication network including multiple network elements. Some of the elements in a network that employs the embodiments may be routers, switches, gateways, or other network devices. For example, some of the nodes may be specially configured routers such as those available from Cisco Systems, Inc. of San Jose, Calif. As used herein the term router is used to refer to devices that forward packets based on network and higher layer information. The router may include, for example, a master central processing unit (CPU), interfaces, and a bus (e.g., a PCI bus). When acting under the control of appropriate software or firmware, the CPU is responsible for such router tasks as routing table computations, network management, and general processing of packets. It preferably accomplishes all of these functions under the control of software including an operating system and any appropriate application software. In one embodiment, the network device is implemented on a general purpose network machine as described below with respect to FIG. 4.

Figure 2:
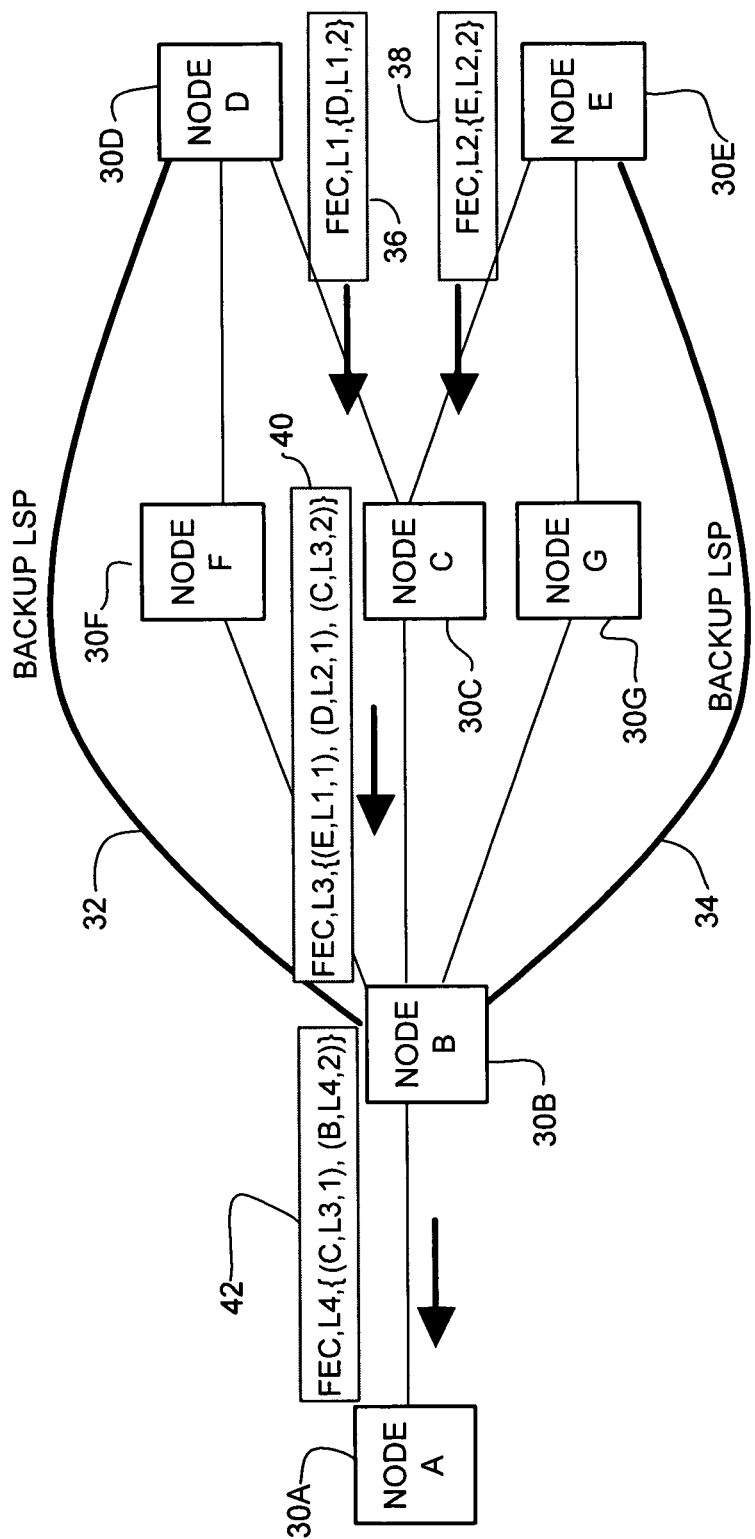
FIG. 2 illustrates another example of a network in which embodiments described herein may be implemented.

Referring now to the drawings, and first to FIGS. 1 and 2, networks in which embodiments described herein may be implemented are shown. FIG. 1 illustrates one branch of an mLDP multicast tree (node B-node C-node E) and a backup tunnel (node B-node D-node E) protecting a node (node C) in the multicast tree. FIG. 2 illustrates two branches of an mLDP multicast tree (node B-node C-node D and node B-node C-node E) and backup tunnels (node B-node F-node D and node B-node G-node E) protecting a node (node C) in the multicast tree. It is to be understood that the simplified networks shown in FIGS. 1 and 2 are only examples illustrating a portion of a larger network, and the embodiments described herein may be implemented in networks having different topologies and network devices.

In one embodiment, the networks are Multi-Protocol Label Switching (MPLS) networks in which Label Switched Paths (LSPs) are established for Forwarding Equivalence Classes (FECs). Packets that share the same requirement for transport across the MPLS network share the same FEC. On each node of the LSP, a specific label is allocated for the FEC. Labeled packets are forwarded along the LSP, which includes one or more Label Switching Routers (LSRs). The LSRs of the LSP decide how to forward an incoming packet based on the packet's incoming label. LSRs utilize Label Information Base (LIB) tables that map incoming labels of incoming packets to outgoing labels of outgoing packets and outgoing interfaces.

The embodiments described herein may be implemented in networks having point-to-multipoint (P2MP) or multipoint-to-multipoint (MP2MP) LSPs (referred to collectively as multipoint LSPs (MP LSPs). The MP LSPs may be created as described in Internet Draft "Label Distribution Protocol Extensions for Point-to-Multipoint and Multipoint-to-Multipoint Label Switched Paths", draft-ietf-mpls-ldp-p2mp-08, Minei et al., Oct. 24, 2009, for example. A multicast tree is mapped to the MP LSP and mLDP is used to distribute labels.

Referring again to FIG. 1, the network includes a plurality of nodes (node A (12A), node B (12B), node C (12C), node D (12D), and node E (12E)). The nodes may be LSRs, for example. The nodes are coupled through network links 14, 16, 18, 20, 22. More specifically, link 14 connects node A and node B, link 16 connects node B and node C, link 18 connects node C and node E, link 20 connects node B and node D, and link 22 connects node D and node E. Node A is a multicast source transmitting to a multicast group that includes multiple receivers (only one receiver shown). Node E is a leaf (receiver) node that receives multicast traffic from root node A via transit nodes B and C.

A primary LSP extends from node A to node E, through nodes B and C. Node C is protected by a backup tunnel extending from node B to node E through node D. Thus, node C is referred to as a protected node. The backup tunnel protects the primary LSP if node C fails by enabling node B, located upstream of the failure, to reroute the LSP and its traffic around the failed node. Node E, therefore, receives traffic from either node C (primary LSP) or node D (backup LSP). Node B is referred to as a Point of Local Repair (PLR) and node E is referred to as a next-next-hop (NNHOP). Backup tunnels that bypass next-hop nodes along LSPs are referred to as next-next-hop backup tunnels because they terminate at the node following the next-hop of the LSP, thereby bypassing the next-hop node.

Receiver node E joins the multicast tree according to any appropriate mechanism and obtains the relevant identifiers of the multicast tree, namely the root node 12A and the FEC of traffic belonging to the tree. Node E then creates an LDP path from the root node A. Node E identifies its next-hop to the root of the tree from its forwarding table, which is node C and creates a label mapping message 24 for transmittal to its upstream node. The downstream direction for traffic is from node A to node E via node B and node C, thus the label mapping message 24 is sent upstream from node E to node C. The label mapping message 24 indicates the multicast tree FEC and a local label. As described in detail below, the label mapping message also includes a path vector containing the node's own router ID, a local label, and a Time-to-Live (TTL) value. Node C similarly allocates a label (label 6) and updates its forwarding state such that incoming packets with label 6 will have the label swapped for label 7 and forwarded along the LSP to node E. Node C constructs a label mapping message 26 which includes the multicast tree FEC, local label 6, and a path vector. Node C inserts into the path vector received from node E, its own router ID, local label, and TTL. Upon receiving message 26 from node C, node B generates and transmits label mapping message 28 to node A. Details of the label mapping messages and generation of the path vectors are described below.

Referring now to FIG. 2, the multicast tree for the primary LSP extends from root node A (30A) to node D (30D) and node E (30E). The path from node A to node D passes through node B (30B) and node C (30C). The path from node A to node E also passes through node B and node C. The backup tunnels 32, 34 protecting node C extend from node B to node D, via node F (30F) and from node B to node E, via node G (30G). Details of label mapping messages 36, 38, 40, 42 used to identify the leaf nodes of protected node 30C at the PLR node 30B, and creation of the backup tunnels are described below following an overview of a process for mLDP node protection.

Figure 3:
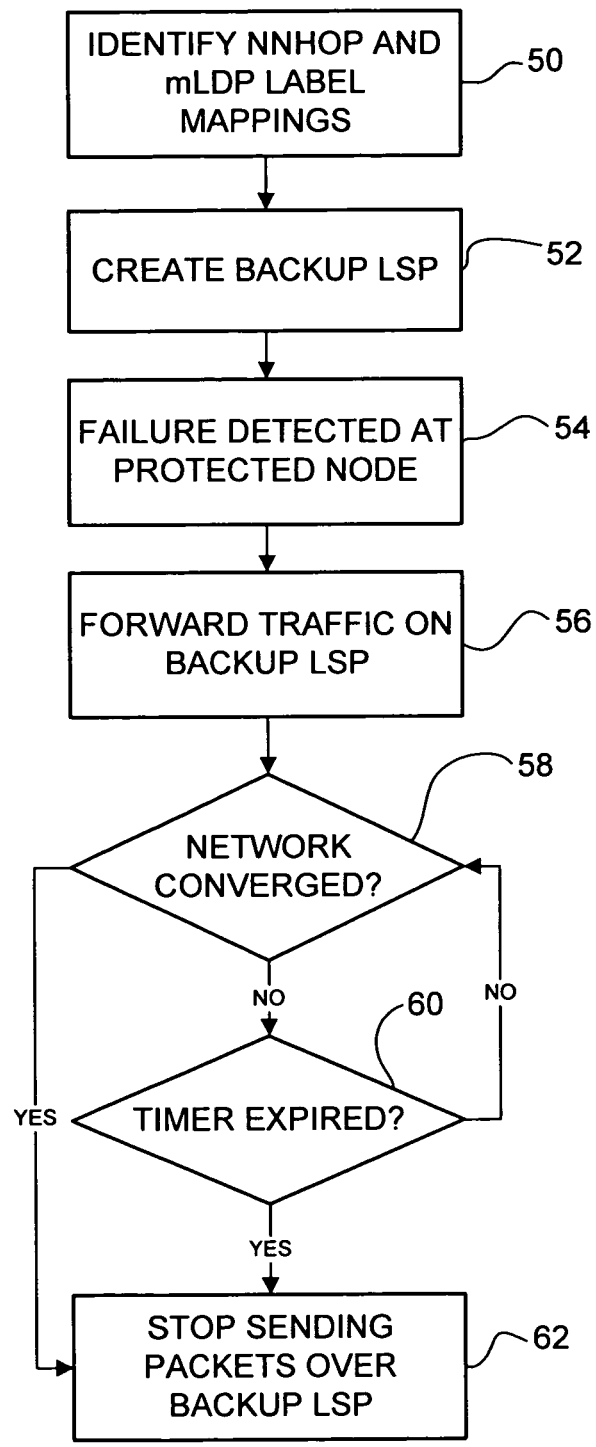
FIG. 3 is a flowchart illustrating a process for mLDP node protection, in accordance with one embodiment.

FIG. 3 is a flowchart illustrating a process for mLDP node protection, in accordance with one embodiment. At step 50, a PLR identifies the next-next-hops (leaf nodes) in a primary LSP and their mLDP label mappings. In FIG. 1, for example, PLR 12B identifies the leaf node 12E. In FIG. 2, PLR 30B identifies the leaf nodes 30D, 30E. In one embodiment, the node information is provided to the PLR 12B, 30B in a label mapping message which includes a path vector containing local node information (e.g., node ID, local label, and time-to-live value) for each node in the path to the next-next-hop. Backup LSPs to the next-next-hop nodes 12E, 30D, 30E are created using, for example, RSVP-TE or LFA (step 52). At step 54, the PLR 12B, 30B detects a failure at the protected node 12C, 30C. Detection of a failure at the protected node may be accomplished using link down events, BFD (Bidirectional Forwarding Detection), or any other suitable detection means. Traffic directed to the leaf nodes 12E, 30D, 30E is then forwarded on the backup LSPs at the PLR 12B, 30B (step 56). If the PLR 12B, 30B receives an indication that the network has converged following the failure, the PLR can stop sending packets over the backup LSP (steps 58 and 62). A timer may also be used to determine when the PLR should stop sending packets over the backup LSP (steps 60 and 62).

It is to be understood that the process illustrated in the flowchart of FIG. 3 is only an example and that steps may be removed, added, or reordered without departing from the scope of the embodiments. For example, the timer at step 60 may be used as a backup to the PLR identifying that the network has converged (step 58) or may be used alone, without step 58. Also, step 58 may be used without the failsafe timer of step 60.

In order for the PLR 12B, 30B to identify the leaf nodes of the protected node 12C, 30C (step 50 in FIG. 3), each node participating in the mLDP LSP injects its own node (router) ID and local label into a path vector in the mLDP label mapping message before sending the message to its upstream node. The path vector accumulates all of the node IDs and local labels in the primary LSP. The node information only needs to be forwarded to the PLR, which is typically one hop away. The information does not need to travel all the way up to the root node 12A, 30A. In order to prevent the path vector updates to travel any further than necessary, a Time-to-Live (TTL) value is associated with the path vector and decremented at each hop. In order to reach the PLR 12B, 30B that is one hop away from the leaf node 12E, 30D, 30E, a TTL of two is used. When a node receives a path vector update with a TTL of one, the update is not propagated any further. Using this method, it is possible to reach a PLR that is multiple hops away by increasing the TTL. For example, if a node is three hops away from the PLR, the TTL will be set to three. Use of the TTL in the path vector provides scalability benefits. Without the TTL, all of the nodes participating in the LSP would be advertised in the direction of the root. Therefore, the closer you get to the root, the more information that needs to be stored.

PLR 12B, 30B uses the path vector to see which leaf nodes are directly connected to a downstream node and the local labels assigned to the LSP. If the downstream protected node 12C, 30C fails, the PLR has enough information to send the packets to the downstream leaf nodes directly using the backup LSPs.

Referring again to the example shown in FIG. 1, node E transmits mLDP message 24 to node C, node C transmits mLDP message 26 to node B, and node B transmits mLDP message 28 to node A. Message 24 includes an FEC identifying the multicast tree and a local label 7. Also included in the mLDP message 24, is a path vector which includes a node ID (E), a local label (7) and a TTL value of 2. The TTL is set to 2 because node E is two hops away from PLR node B. Upon receiving the mLDP label mapping message 24 at node C, node C replaces label 7 with its own local label 6 and inserts its own node information into the path vector. As shown in FIG. 1, the local node information for node C includes node ID (C), local label (6), and a TTL set equal to two. Node C also decrements the TTL in the path vector received from node E to one and retains node E's local node information in the path vector. Node B receives the mLDP label mapping message 26 from node C and replaces the label with its own local label 5. Node B also decrements the TTL from nodes C and E by one. Since the TTL from node E is now zero, the node information for node E is removed from the path vector. The node protection information from node E does not need to travel all the way up to the root node A, since it is only used in protecting node C at PLR node B. Node B also inserts its own node information (node ID (B), local label (5), and TTL (2) into the path vector and transmits the message 28 to node A.

Referring now to FIG. 2, mLDP messages 36, 38, 40, and 42 are shown. Nodes D and E each generate an mLDP label mapping message 36, 38, respectively. Message 36 includes an FEC identifying the mLDP multicast tree, a local label (L1) and a path vector {D, L1, 2}. The path vector contains the node ID (D), local label (L1) and a TTL set to 2. Node E similarly transmits mLDP message 38 which includes FEC, L2 and path vector {E, L2, 2}. The mLDP messages 36, 38 are received at node C, which generates a new mLDP label mapping message 40 containing FEC, local label (L3) and a path vector. The path vector of message 40 includes the node information received from both node D and node E, with the TTL values reduced by one, and its own node information (node ID (C), local label (L3), TTL (2)). Node B receives the mLDP message 40, replaces the local label with its own label (L4), inserts its own node information, and decrements the TTL values for nodes C, D, and E by one. The TTL values for the node information received from nodes D and E are reduced to zero, therefore the node information is removed from the path vector and not transmitted to root node A. The path vector in message 42 transmitted from node B is {(C, L3, 1), (B, L4, 2)}.

The node information received in the path vector may be stored in the Label Information Base (LIB) or Label Forwarding Information Base (LFIB), for example.

Once the next-next-hops are identified at the PLR, backup LSPs are constructed to the next-next-hops. As noted above, the backup LSPs can be created using RSVP-TE P2P LSPs, LFA and LDP based LSPs, or other suitable means for creating backup LSPs (step 52 in FIG. 3). RSVP-TE P2P may be used to create a backup LSP as done for unicast node protection, for example.

Loop Free Alternate (LFA) uses a pre-computed alternate next-hop in the event of a node failure so that traffic can be routed through the alternate next-hop when a failure is detected. Thus, the traffic flow is not disrupted and the network can converge in the background. With multicast LFA, a packet destined to a multicast group is backed up by encapsulation within a tunnel tail-ending at the NNHOP. The path used by this tunnel is provided by an LFA to the NNHOP. Multicast, therefore, requires encapsulation, whereas unicast does not. Multicast also uses an LFA to the NNHOP, whereas unicast uses an LFA to the original destination.

In the example of FIG. 1, the topology is such that node B has a node protecting per-prefix LFA for destination node E via node D. Node B can therefore send packets to node E via node D while avoiding node C. As node D is by LFA definition a neighbor of PLR node B, node D provides a label mapping (e.g., label 8 for FEC=node E). Thus, PLR node B has an LDP LSP to node E, avoiding node C. Upon detection of a failure at node C, PLR node B performs per-packet processing to first swap the mLDP label for the label expected by the NNHOP node E. Node B then pushes label 8 and forwards the packet to neighbor node D.

After the downstream node fails, the PLR forwards traffic over the backup P2P LSPs (step 56 in FIG. 3). However, this should only be temporary until the network converges. Once the network has converged and the routing tables are updated, the traffic flows along the newly calculated primary next hop. In one embodiment, a hold down timer is used to ensure that the nodes wait for a time duration that is enough for the network to converge before they switch to the newly updated tables (steps 60 and 62).

In another embodiment, if the PLR, which is sending packets over a backup LSP due to a failure at the protected node, receives a label mapping that includes a path vector indicating node E is now downstream of a different node not equal to node D, this is an indication that node E has converged (step 58) (FIGS. 1 and 3). Thus, node B can stop sending packets over the backup LSP (step 62). It is possible that the network convergence information may not reach the PLR. For example, if the new backup path is too long, the TTL may prevent the information from reaching the PLR. Therefore, this embodiment may be used to speed up the process, but as a failsafe, the timer is preferably also utilized.

Figure 4:
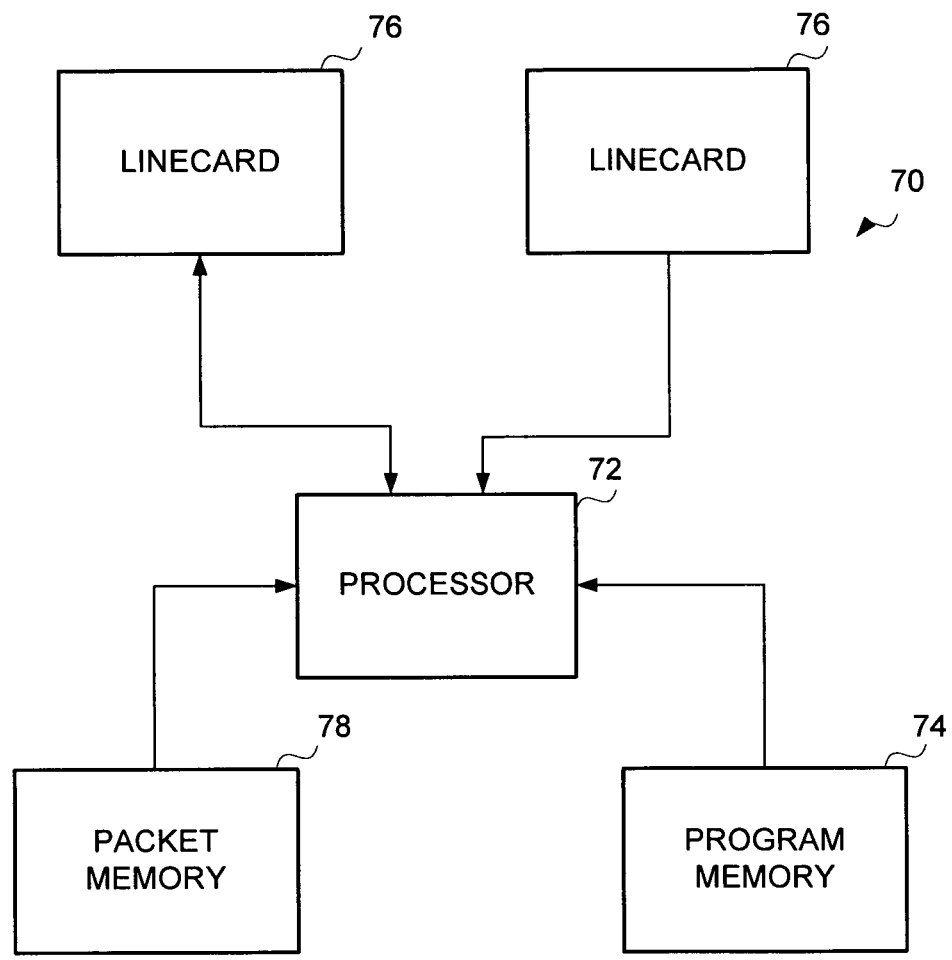
FIG. 4 depicts an example of a network device useful in implementing embodiments described herein.

FIG. 4 depicts a network device 70 that may be used to implement embodiments described herein. In one embodiment, network device 70 is a programmable machine that may be implemented in hardware, software, or any combination thereof. Logic may be encoded in one or more tangible media for execution by processor 72. For example, processor 72 may execute codes stored in a program memory 74. Program memory 74 can be utilized to store and retrieve software programs incorporating computer code that implements aspects of the embodiments, data for use with the embodiments, and the like. Program memory 74 is one example of a computer-readable medium. Program memory 74 can be a volatile memory. Another form of computer-readable medium storing the same codes would be some type of non-volatile storage such as floppy disks, CD-ROMs, DVD-ROMs, hard disks, flash memory, etc.

Network device 70 interfaces with physical media via a plurality of linecards (network interfaces) 76. Linecards 76 may incorporate Ethernet interfaces, DSL interfaces, Gigabit Ethernet interfaces, 10-Gigabit Ethernet interfaces, SONET interfaces, etc. As packets are received, processed, and forwarded by network device 70, they may be stored in a packet memory 78. To implement functionality according to the system, linecards 76 may incorporate processing and memory resources similar to those discussed above in connection with the network device as a whole.

As can be observed from the foregoing, the method and apparatus described herein provide numerous advantages.

For example, the embodiments enable node protection for mLDP. Also, in some embodiments the use of automated LFA and LDP based backup LSPs simplifies network operation. An optimization which reduces the amount of time the PLR uses the backup LSP is also provided by one of the embodiments.

Although the method and apparatus have been described in accordance with the embodiments shown, one of ordinary skill in the art will readily recognize that there could be variations made without departing from the scope of the embodiments. Accordingly, it is intended that all matter contained in the above description and shown in the accompanying drawings shall be interpreted as illustrative and not in a limiting sense.

What is claimed is:

1. A method comprising:
   receiving at a router, a multicast label distribution protocol message comprising local node information for a protected node and one or more leaf nodes downstream of the protected node in a primary label switched path, said multicast label distribution protocol message comprising a forwarding equivalence class, a local label, and a path vector comprising a node identifier, a local label, and a time-to-live value for each node in a path to said one or more leaf nodes and said leaf node, wherein said time-to-live value for said leaf node is reduced by one at each of the nodes so that node protection information from said leaf node is removed from the path vector at the router if the router is a point of local repair;
   creating one or more backup label switched paths to said one or more leaf nodes, wherein said one or more backup label switched paths do not pass through the protected node;
   detecting a failure at the protected node; and
   forwarding at the router, traffic for said one or more leaf nodes to said one or more backup label switched paths.

2. The method of claim 1 further comprising:
   inserting local node information for the router into a multicast label distribution protocol message containing said local node information for the protected node; and
   transmitting said multicast label distribution protocol message to an upstream node.

3. The method of claim 1 wherein creating said backup label switched path comprises creating a loop free alternate label distribution protocol label switched path.

4. The method of claim 1 wherein creating said backup label switched path comprises creating a Resource ReSerVation Protocol —Traffic Engineering label switched path.

5. The method of claim 1 wherein the leaf node is a next-next-hop and said backup label switched path is a point-to-point label switched path from the router to the next-next-hop.

6. The method of claim 1 further comprising:
   receiving an indication that one of the leaf nodes has converged following said failure; and
   stopping said forwarding of said traffic to said backup label switched path.

7. The method of claim 3 wherein the leaf node is a next-next-hop.

8. An apparatus comprising:
   a processor for processing a multicast label distribution protocol message received at the apparatus and comprising local node information for a protected node and one or more leaf nodes downstream of the protected node in a primary label switched path, creating one or more backup label switched paths to said one or more leaf nodes, wherein said one or more backup label switched paths do not pass through the protected node, detecting a failure at the protected node, and forwarding traffic for said one or more leaf nodes to said one or more backup label switched paths; and
   memory for storing said local node information and a label for said backup label switched path;
   wherein said multicast label distribution protocol message comprises a forwarding equivalence class, a local label, and a path vector comprising a node identifier, a local label, and a time-to-live value for each node in a path to said one or more leaf nodes and said leaf node, wherein said time-to-live value for said leaf node is reduced by one at each of the nodes so that node protection information from said leaf node is removed from the path vector at the router if the apparatus is a point of local repair.

9. The apparatus of claim 8 wherein the processor is configured to insert local node information for the router into a multicast label distribution protocol message containing said local node information for the protected node and transmit said multicast label distribution protocol message to an upstream node.

10. The apparatus of claim 8 wherein creating said backup label switched path comprises creating a loop free alternate label distribution protocol label switched path.

11. The apparatus of claim 8 wherein creating said backup label switched path comprises creating a Resource ReSerVation Protocol —Traffic Engineering label switched path.

12. The apparatus of claim 8 wherein the leaf node is a next-next-hop and said backup label switched path is a point-to-point label switched path from the apparatus to the next-next-hop.

13. An apparatus comprising:
   means for processing a multicast label distribution protocol message received at the apparatus, the message comprising local node information for a protected node and one or more leaf nodes downstream of the protected node in a primary label switched path, said multicast label distribution protocol message comprising a forwarding equivalence class, a local label, and a path vector comprising a node identifier, a local label, and a time-to-live value for each node in a path to said one or more leaf nodes and said leaf node, wherein said time-to-live value for said leaf node is reduced by one at each of the nodes so that node protection information from said leaf node is removed from the path vector at the apparatus if the apparatus is a point of local repair; and
   means for creating one or more backup label switched paths to said one or more leaf nodes, wherein said one or more backup label switched paths do not pass through the protected node;
   wherein said one or more backup label switched paths each comprises a loop free alternate label switched path from the apparatus to a next-next-hop.

14. The apparatus of claim 13 further comprising means for inserting local node information for the apparatus into a multicast label distribution protocol message containing said local node information for the protected node and transmitting said multicast label distribution protocol message to an upstream node.

15. The apparatus of claim 13 wherein means for creating said backup label switched path comprises means for creating a loop free alternate label distribution protocol label switched path.

16. The apparatus of claim 13 wherein creating said backup label switched path comprises creating a Resource ReSerVation Protocol —Traffic Engineering label switched path.

17. The apparatus of claim 13 wherein the leaf node is a next-next-hop and said backup label switched path is a point-to-point label switched path from the router to the next-next-hop.

* * * * *